United States Patent [19]

Gardner

[11] Patent Number: 4,626,570
[45] Date of Patent: Dec. 2, 1986

[54] LOW SHRINKING THERMOSETTING POLYESTER RESIN COMPOSITIONS AND A PROCESS FOR THE PREPARATION THEREOF

[75] Inventor: Hugh C. Gardner, Somerville, N.J.

[73] Assignee: Union Carbide Corporation, Danbury, Conn.

[21] Appl. No.: 625,913

[22] Filed: Jun. 29, 1984

[51] Int. Cl.⁴ ............................................. C08L 67/06
[52] U.S. Cl. .................................... 525/12; 525/13; 525/20; 525/23; 525/34; 525/44; 525/168; 525/170
[58] Field of Search ................... 525/44, 12, 43, 168, 525/170, 48, 49, 13, 20, 23, 34

[56] References Cited

U.S. PATENT DOCUMENTS

| | | | |
|---|---|---|---|
| 29,555 | 2/1978 | Canning et al. | 260/22 CB |
| 2,671,070 | 3/1954 | Knapp | 260/45.4 |
| 3,166,434 | 1/1965 | Gauger, Jr. | 117/57 |
| 3,188,303 | 6/1965 | Dissen | 260/78.4 |
| 3,340,327 | 9/1967 | Spellberg et al. | 260/861 |
| 3,883,612 | 5/1975 | Pratt et al. | 260/862 |
| 3,933,757 | 1/1976 | Pratt et al. | 260/75 A |
| 3,957,736 | 5/1976 | Tsuchiya et al. | 526/11.1 |
| 3,986,992 | 10/1976 | Canning et al. | 260/22 CB |
| 4,029,848 | 6/1977 | Nelson | 428/430 |
| 4,035,439 | 7/1977 | Stevenson | 260/859 R |
| 4,100,120 | 7/1978 | Maekawa et al. | 260/22 CB |
| 4,148,765 | 4/1979 | Nelson | 260/22 CB |
| 4,224,430 | 9/1980 | Maekawa et al. | 526/282 |
| 4,233,413 | 11/1980 | Monma et al. | 525/168 |
| 4,233,432 | 11/1980 | Curtis, Jr. | 528/298 |
| 4,246,367 | 1/1981 | Curtis, Jr. | 525/49 |
| 4,263,199 | 4/1981 | Atkins | 525/19 |
| 4,319,009 | 3/1982 | Friedli | 526/62 |
| 4,374,215 | 2/1983 | Atkins | 523/514 |

OTHER PUBLICATIONS

D. L. Nelson, Considerations: Dicyclopentadiene in Polyester Resins, 36th Annual Conference, Reinforced Plastics/Composites Institute, The Society of the Plastics Industry, Inc., Feb. 16-20, 1981, Session 7-E, pp. 1-7.

*Primary Examiner*—John C. Bleutge
*Assistant Examiner*—Patricia Short
*Attorney, Agent, or Firm*—Morris N. Reinisch

[57] ABSTRACT

This invention relates to low shrinking, low viscosity curable polyester resin compositions, which compositions contain a mixture of (i) an unsaturated ester terminally modified with a reactive olefin such as dicyclopentadiene or other Diels-Alder adducts of cyclopentadiene with an olefinic or acetylenic hydrocarbon or alkylated derivative thereof, (ii) a copolymerizable ethylenically unsaturated monomer which serves to crosslink the unsaturated polyester to a thermoset product, and (iii) a thermoplastic polymer low profile additive. Cured articles prepared from these curable polyester resin compositions exhibit reduced surface roughness. Fiber reinforced thermoset articles can be produced from these curable resin compositions.

17 Claims, No Drawings

LOW SHRINKING THERMOSETTING POLYESTER RESIN COMPOSITIONS AND A PROCESS FOR THE PREPARATION THEREOF

BRIEF SUMMARY OF THE INVENTION

TECHNICAL FIELD

This invention relates to low shrinking, low viscosity curable polyester resin compositions, which compositions contain a mixture of (i) an unsaturated ester terminally modified with a reactive olefin such as dicyclopentadiene or other Diels-Alder adducts of cyclopentadiene with an olefinic or acetylenic hydrocarbon or alkylated derivative thereof, (ii) a copolymerizable ethylenically unsaturated monomer which serves to crosslink the unsaturated polyester to a thermoset product, and (iii) a thermoplastic polymer low profile additive. Cured articles prepared from these curable polyester resin compositions exhibit reduced surface roughness. Fiber reinforced thermoset resin articles having reduced surface roughness can be produced from these curable polyester resin compositions by a rapid injection molding process.

BACKGROUND OF THE INVENTION

Unsaturated polyester resins are typically used as the resin component in the manufacture of fiber reinforced thermoset plastics. The resins generally consist of unsaturated polyesters dissolved in a polymerizable ethylenically unsaturated monomer such as styrene. Typically, these unsaturated polyesters are formed by reacting an unsaturated diacid or anhydride with a nearly equivalent amount of dihydric alcohol at temperatures above about 200° C. for several hours. Maleic anhydride is the most common acid component utilized. The dihydric alcohols which are commonly used include ethylene glycol, 1,2-propylene glycol, dipropylene glycol, diethylene glycol, and the like. Modifying amounts of other diacids, such as phthalic acid, isophthalic acid, terephthalic acid, or adipic acid are also commonly employed. Phthalic anhydride is also often used. Unsaturation which is provided by maleate or fumarate groups within the backbone of the polyester takes part in the crosslinking, or curing, of unsaturated polyester resins. These unsaturated polyester resins are considered among the least expensive resins suitable for the manufacture of a variety of fiber reinforced products.

Much effort has recently been directed toward the development of alternative resin systems with potentially improved economics. To be a viable alternative, such resin systems should exhibit the highly desirable properties of conventional unsaturated polyester resins and provide fiber reinforced thermoset articles having good mechanical properties. Modification of unsaturated polyesters with olefins such as dicyclopentadiene has been investigated as one method for reducing the cost of unsaturated polyester resins systems.

Investigators have found that incorporation of dicyclopentadiene results in two structurally different types of polyesters. See, for example, D. L. Nelson, Considerations: Dicyclopentadiene in Polyester Resins, 36th Annular Conference, Reinforced Plastics/Composites Institute, The Society of the Plastics Industry, Inc., Feb. 16-20, 1981, Session 7-E, pages 1-7. One polyester type contains ester and/or ether groups resulting from carboxyl or hydroxyl addition to one of the dicyclopentadiene double bonds. Such ester and/or ether addition groups have the formula

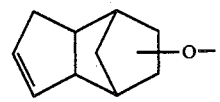

The other polyester type contains Diels-Alder reaction groups resulting from dimer cracking and subsequent reaction of cyclopentadiene with a dieneophile such as maleic acid. Such Diels-Alder groups have the formula

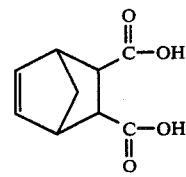

when maleic acid is the dieneophile. Combinations of the above groups may also be incorporated in polyesters.

U.S. Pat. Nos. 4,233,432 and 4,246,367, both assigned to United States Steel Corporation, disclose dicyclopentadiene modified polyester resins and a method for preparation thereof. The resins are prepared by reacting maleic anhydride and water with dicyclopentadiene at a temperature of about 90° C. to 150° C. to give a maleic half ester of dicyclopentyl alcohol, and thereafter reacting a glycol, e.g., propylene glycol, at a temperature of about 210° C. to form the resultant unsaturated polyester.

U.S. Pat. No. 4,224,430, assigned to Hitachi Chemical Company, Ltd., discloses high solids resin compositions containing one or more oligomers prepared by reacting dicyclopentadiene with an alpha, beta-unsaturated hydrocarbon, e.g., maleic acid or maleic anhydride, at a temperature of from 100° C.-140° C. to yield a monobasic acid, which is further reacted with a polyhydric alcohol, e.g., diethylene glycol, at a temperature of from 180°-220° C. Cast articles were prepared from the resin compositions.

U.S. Pat. Nos. 4,029,848 and 4,148,765, both assigned to Dow Chemical Company, disclose resin compositions containing an unsaturated polyester obtained by reacting (1) a glycol, e.g., propylene glycol, (2) an olefinically unsaturated dicarboxylic acid or anhydride, e.g., maleic anhydride, (3) a saturated dicarboxylic acid or anhydride, e.g., phthalic anhydride, and (4) dicyclopentadiene at a temperature of about 140° C. for a period of time and thereafter at a temperature of about 200° C. for an additional period of time. Glass laminates were prepared from certain of the resin compositions by a hand roller technique.

U.S. Pat. Nos. 3,166,434 and 3,340,327 disclose resin compositions containing an unsaturated polyester obtained by reacting (1) an unsaturated dicarboxylic acid containing a major molar proportion of fumaric acid, (2) a glycol containing a major molar proportion of polyoxyalkylene glycol and (3) dicyclopentadiene at a temperature up to about 215° C. in the absence of a catalyst (see Example 1 in both patents). Diels-Alder reaction products accompany this polyesterification reaction. Coatings were prepared from certain of the resin compositions.

Some polyester resins with potentially improved economics have been developed which impart smooth surfaces to molded products prepared therefrom. Surface smoothness is an important characteristic of fiber reinforced composites for many applications such as automotive body panels and appliance housings. A thermoplastic polymer low profile additive is typically used in resin systems in which molded articles having good surface properties are desired.

U.S. Pat. No. 4,233,413, assigned to Hitachi Chemical Company, Ltd., discloses low shrink resin compositions containing an unsaturated polyester obtained by reacting dicyclopentadiene with an alpah, beta-unsaturated dibasic acid, e.g., maleic acid, or reacting dicyclopentadiene with an alpha, beta-unsaturated dibasic acid anhydride, e.g., maleic anhydride and water at 150° C. or lower to yield a partially esterfied dicyclopentadiene carboxylic acid, which is further reacted with at least one polyhydric alcohol such as a glycol. e.g., propylene glycol, at a temperature of from 150° C.–210° C. This patent discloses cast articles prepared from the resin compositions.

U.S. Pat. Nos. 3,883,612, 3,933,757, 3,986,992, 4,035,439 and 29,555, all assigned to SCM Corporation, disclose thickened, low shrink molding compositions containing a dicyclopentadiene-modified polyester polymer obtained by the following steps: (1) reacting a glycol, e.g., propylene glycol, and an unsaturated dibasic acid, e.g., maleic acid, at a temperature of about 150° C. to yield an acid terminated partial copolymer; (2) reacting dicyclopentadiene with the partial copolymer prepared in step (1) at a temperature of about 150° C. to yield a prepolymer; (3) reacting additional glycol with the prepolymer of (2) at a temperature of about 200° C. to yield a dicyclopentadiene polyester polymer; and (4) adding styrene to the dicyclopentadiene polyester polymer. Sheet molding compounds (SMC) and bulk molding compounds (BMC) were prepared from certain of the molding compositions.

In all of the above prior art methods, dicyclopentadiene or its reaction product is present in the reaction mixture with an unsaturated diacid or anhydride and a dihydric alcohol at temperatures of from about 150° C. to about 220° C. At these temperatures, both reacted and unreacted dicyclopentadiene become increasingly susceptible to fragmentary side reactions. For example, the remaining double bond in reacted dicyclopentadiene becomes increasingly susceptible to esterification and etherification reactions. Also, the formation of carbic acid can potentially occur at these high reaction temperatures. Any unreacted dicyclopentadiene can readily undergo dimer cracking at temperatures above about 150° C. and thereby provide for the formation of Diels-Alder groups which can be incorporated into the structure of the polyester. Gelation of dicyclopentadiene modified polyesters has occasionally been observed during polyesterification at temperatures of from 150° C. to 220° C., apparently due to side reactions involving the olefin. See, for example, Comparative Example A hereinbelow. Therefore, it would be highly desirable to prepare dicyclopentadiene modified polyesters by a process in which dicyclopentadiene is selectively reacted with a polyester having terminal fumarate half ester groups at low reaction temperatures. It would also be highly desirable to provide low shrinking curable resin compositions containing such dicyclopentadiene modified polyesters which would impart reduced surface roughness to fiber reinforced composites prepared therefrom.

It has been found as a result of this invention that dicyclopentadiene can be selectively reacted at low reaction temperatures with a polyester having fumarate half ester groups by utilizing a non-oxidizing acid catalyst having a non-nucleophilic anion. It has further been found that resin compositions containing (i) the dicyclopentadiene modified polyesters of this invention, (ii) an ethylenically unsaturated monomer, and (iii) a selected thermoplastic polymer low profile additive impart decreased surface roughness to fiber reinforced composites molded therefrom. These low shrinking resin compositions may be used in a rapid injection molding process, sheet molding compound (SMC) and bulk molding compound (BMC).

Dicyclopentadiene need no longer be exposed to high reaction temperatures utilized in the prior art methods, and therefore dicyclopentadiene is significantly less susceptible to fragmentary side reactions. The dicyclopentadiene modified polyesters of this invention contain predominantly terminal ester groups resulting from selective acid addition to one of the dicyclopentadiene double bonds. The formation of Diels-Alder reaction products is selectively minimized by utilizing dicyclopentadiene at low reaction temperatures.

There appears to be no prior art directed to the addition of dicyclopentadiene at low reaction temperatures by polyesters containing predominantly fumarate half ester terminal groups and, in particular, to low shrinking resin compositions containing such polyesters.

The low shrinking curable polyester resin compositions of this invention exhibit highly desirable properties, e.g., low viscosity, rapid cure rate, excellent moisture resistance, good high temperature properties, and the like, and also provide fiber reinforced composites having good mechanical properties and reduced surface roughness. These low shrinking polyester resin systems are very suitable for use in reaction injection molding of fiber reinforced thermoset articles. The low shrinking curable resin compositions exhibit faster cure rates than the resin systems of U.S. patent application Ser. No. 626,146, now U.S. Pat. No. 4,532,297, filed on an even date herewith.

DISCLOSURE OF THE INVENTION

This invention relates to a process for preparing low shrinking curable polyester resin compositions, which process comprises:

(a) contacting a molar excess of an alpha, beta unsaturated dicarboxylic acid or derivative thereof, preferably selected from maleic acid or anhydride and fumaric acid, with an organic polyol for a time and at a temperature sufficient to form a composition comprising a carboxylic acid terminated polyester having the formula:

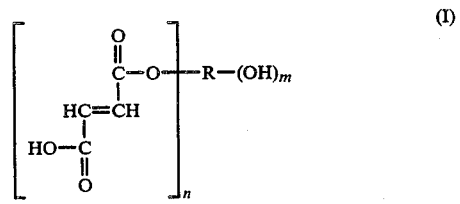

wherein n is a number having an average value of about 2 to less than about 4, m is a number equal to the free valence of R less the average value of n, the ratio of n to m is at greater than about 2.0, preferably at least about 3.0, and R is the residuum of a polyester which contained from 2 to 4 inclusive hydroxyl groups;

(b) contacting a Diels-Alder adduct of cyclopentadiene with an olefinic or acetylenic hydrocarbon or alkylated derivative thereof with the carboxylic acid terminated polyester of (a) in the presence of a non-oxidizing acid catalyst having a non-nucleophilic anion for a time and at a temperature sufficient to form a composition comprising an unsaturated ester having the formula:

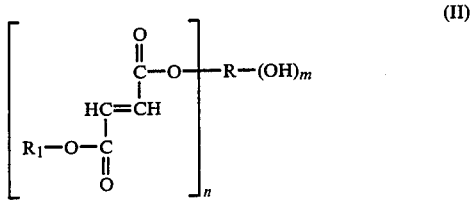

wherein n, m and R are as defined above and $R_1$ is the residuum of a Diels-Alder adduct of cyclopentadiene with an olefinic or acetylenic hydrocarbon or alkylated derivative thereof having from 2 to about 20 carbon atoms;

(c) admixing a copolymerizable ethylenically unsaturated monomer with the unsaturated ester of (b); and (d) admixing a thermoplastic polymer low profile additive with the mixture of (c).

The low shrinking curable polyester resin compositions prepared by the process of this invention can produce fiber reinforced thermoset molded articles having improved surface smoothness in comparison with fiber reinforced thermoset molded articles prepared from curable resin compositions which do not contain a thermoplastic polymer low profile additive as described herein. The low shrinking curable polyester resin compositions prepared by the process of this invention are particularly suitable for the rapid fabrication of fiber reinforced thermoset articles having improved surface appearance properties. Such fiber reinforced thermoset articles can have utility in surface critical molded articles or parts such as automobile exteriors, appliance housings and the like. Typical surface critical molded articles or parts have profiles of less than 200 microinches when measured with a Bendix profilometer, and are essentially free of undulations, fiber prominence, pits and similar defects.

The unfilled curable polyester resin compositions prepared by the process of this invention have a low viscosity, i.e., from about 10 to about 2500 centipoises, preferably less than about 1500 centipoises, and most preferably less than about 1000 centipoises, so that they can be used to produce low shrink thermoset resin articles containing up to about 75 weight percent of reinforcing fibers by a rapid injection molding process. A low viscosity curable molding composition is highly desirable in a rapid injection molding process in order to avoid any movement of the reinforcing fibers during the injection step. Low profile fiber reinforced thermoset resin articles can be produced from the curable molding compositions of this invention by a rapid injection molding process which is typically less than three minutes, oftentimes less than two minutes, from the time the cure of the resin mixture is initiated. Other composite fabrication processes such as spray up, wet lay up, resin transfer molding, centrifugal casting and filament winding can also utilize the low shrinking resin compositions of this invention. The low shrinking resin compositions can also be used in sheet molding compound (SMC) and bulk molding compound (BMC).

Process step (b) of this invention in which dicyclopentdiene is selectively added to the carboxylic acid terminated polyester is carried out at a temperature below 150° C. Dicyclopentadiene is therefore not exposed to high reaction temperatures. No volatile by-products are formed during this process which is an economically attractive feature. Dicyclopentadiene modified polyesters prepared by the process of this invention have comparatively narrow molecular weight distributions as determined by conventional analytical techniques such as gel permeation chromatography. The dicyclopentadiene modified polyesters contain predominantly terminal ester groups resulting from selective addition of carboxyl groups to one of the dicyclopentadiene double bonds. The formation of Diels-Alder reaction products such as carbic anhydride or carbic acid is selectively minimized by utilizing dicyclopentadiene at low reaction temperatures.

DETAILED DESCRIPTION

The process for preparing the low shrinking curable polyester resin compositions which are suitable for use in the fabrication of fiber reinforced thermoset articles involves the following general steps:

(1) Preparation of a carboxylic acid terminated unsaturated polyester having predominantly terminal fumarate half ester groups by reacting a molar excess of an alpha, beta unsaturated dicarboxylic acid or derivative therof selected from maleic acid or anhydride and fumaric acid with an organic polyol;

(2) Addition of a non-oxidizing acid catalyst having a non-nucleophilic anion;

(3) Preparation of an unsaturated ester by selectively reacting a Diels-Alder adduct of cyclopentadiene with an olefinic or acetylenic hydrocarbon or alkylated derivative thereof such as dicyclopentadiene with terminal carboxylic acid groups of the unsaturated polyester of step (1);

(4) Addition of an ethylenically unsaturated monomer such as styrene; and (5) Addition of a thermoplastic polymer low profile additive.

Process step (3) of this invention in which dicyclopentadiene is selectively added to the carboxylic acid terminated polyester is carried out at a temperature below 150° C. Dicyclopentadiene is therefore not exposed to high reaction temperatures. No volatile by-products are formed during this process which is an economically attractive feature. The dicyclopentadiene modified polyesters contain predominantly terminal ester groups resulting from selective carboxyl addition to one of the dicyclopentadiene double bonds. The formation of Diels-Alder reaction products such as carbic anhydride or carbic acid is selectively minimized by utilizing dicyclopentadiene at low reaction temperatures. The low shrinking curable polyester resin compositions prepared by the process of this invention are particularly suitable for the rapid fabrication of fiber reinforced thermoset articles having reduced surface roughness.

The carboxylic acid terminated unsaturated polyester prepared in step (1) can be characterized by the following empirical formula:

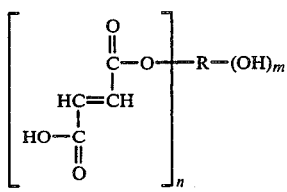

(I)

wherein n is a number having an average value of about 2 to less than about 4, m is a number equal to the free valence of R less the average value of n, the ratio of n to m is greater than about 2.0, preferably at least about 3.0, and R is the residuum of a polyester which contained from 2 to 4 inclusive hydroxyl groups. Since low molecular weight polyesters are preferred, a molar excess of alpha, beta unsaturated dicarboxylic acid or derivative thereof is employed in the process. The molar excess is between about 5 and 60 percent, preferably between about 15 and 50 percent.

The temperature utilized in step (1) can range from about 150° C. to about 240° C., preferably from about 170° C. to about 220° C. The reaction time for step (1) can range from about 1 hour or less to about 20 hours or longer. The only requirement is that the alpha, beta ethylenically unsaturated dicarboxylic acid or derivative thereof and the organic polyol react for a time and at a temperature sufficient to form the carboxylic acid terminated unsaturated polyester having predominantly terminal fumarate half ester groups.

The alpha, beta unsaturated dicarboxylic acids or derivatives thereof which can suitably be employed in step (1) above include maleic acid and anhydride and fumaric acid. Modifying amounts of other acids or anhydrides not containing reactive carbon-carbon double bonds such as ortho-phthalic acid and anhydride, isophthalic acid, terephthalic acid, and adipic acid may also be used. The amount of these acids or anhydrides should be less than 40 percent on a molar basis of the total moles of acid and anhydride in the polyester. A molar excess of alpha, beta unsaturated dicarboxylic acid or anhydride is employed in step (1) to provide a polyester composition having predominantly terminal fumarate half ester groups. Typical polyesters contain at least 75 mole percent of terminal carboxylic acid groups.

Carbic acid is bicyclo[2.2.1]hept-5-ene-2,3-dicarboxylic acid and carbic anhydride is bicyclo[2.2.1]hept-5-ene-2,3-dicarboxylic acid anhydride.

The R group in the carboxylic acid terminated unsaturated polyester depicted by empirical formula (I) is derived from a polyester having a number average molecular weight not exceeding 3000 and is obtained by the condensation of a diol with an dicarboxylic acid or anhydride, or mixtures of diols and diacids. Isomerization of the maleate to fumarate configuration occurs simultaneously with polyesterification. The polyester is typically prepared at temperatures of about 200° C. from diols such as 1,2-propylene glycol, ethylene glycol, 1,3-butanediol, 2,2-dimethyl-1,3-propanediol, dipropylene glycol, diethylene glycol, 2,2-dimethyl-3-hydroxypropyl 2,2-dimethyl-3-hydroxypropionate, 1,4-cyclohexane dimethanol, trimethylolpropane, polycaprolactone esters of trimethylolpropane or 1,4-butanediol, 2,2-bis(4-hydroxy-phenyl)propane, the ethylene and propylene oxide adducts of 2,2-bis(4-hydroxypropyl)propane, and mixtures thereof, and a molar excess of dicarboxylic acids or anhydrides, such as maleic acid and anhydride or fumaric acid.

Modifying amounts of trifunctional acids, such as trimellitic acid; linear saturated diacids, such as adipic acid; or triols, such as trimethylol propane may also be used.

Typical polyesters have acid numbers of 100 to 300 mg KOH per gram of polyester. To obtain optimum surface characteristics from the low shrinking curable resin compositions of this invention, the polyol component should contain at least 70 percent on a molar basis of one or more of the following polyols: propylene glycol, diethylene glycol, ethylene glycol or 1,3-butanediol. The preferred polyol is propylene glycol.

The catalyst added to the reaction mixture in step (2) above is a non-oxidizing acid catalyst having a non-nucleophilic anion. This catalyst is essential for effecting the selective addition of a reactive olefin such as dicyclopentadiene or other Diels-Alder adducts of cyclopentadiene with an olefinic or acetylenic hydrocarbon or alkylated derivative thereof to the carboxylic acid terminated unsaturated polyester prepared in step (1) having predominantly terminal fumarate ester groups. A non-oxidizing acid catalyst having a non-nucleophilic anion is defined herein to mean that (1) a 10 percent by weight water solution has a pH of less than 1.0 and (2) the anion portion of the acid does not easily participate in a displacement reaction with organic halides.

Suitable non-oxidizing acid catalysts having a non-nucleophilic anion include fluoroboric acid, trifluoromethanesulfonic acid (triflic acid), hexafluorophosphoric acid, hexafluoroantimonic acid, and the like. Supported acid catalysts such as Nafion resins may also be used in this invention. The preferred non-oxidizing acid catalyst having a non-nucleophilic anion is fluoroboric acid. Such catalysts are generally employed in an amount of from about 0.01 weight percent to about 4.0 weight percent, preferably from about 0.05 weight percent to about 2.0 weight percent, based on the total weight of the carboxylic acid terminated unsaturated polyester. These catalysts do not adversely affect cure of the low shrinking polyester resin systems of this invention.

Acid or acid acting catalytic materials such as sulfuric acid, zinc chloride or p-toluenesulfonic acid are not suitable for effecting the selective, rapid addition of dicyclopentadiene to the carboxylic acid terminated unsaturated polyesters prepared in step (1).

The unsaturated ester prepared in step (3) above can be characterized by the following empirical formula:

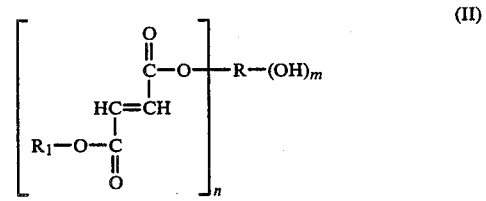

(II)

wherein n, m and R are as defined above and $R_1$ is the residuum of a Diels-Alder adduct of cyclopentadiene with an olefinic or acetylenic hydrocarbon or alkylated derivative thereof having from 2 to about 20 carbon atoms. Suitable olefinic hydrocarbons include ethylene, butadiene, cyclopentadiene, alkylated cyclopentadiene and the like. Suitable acetylenic hydrocarbons include acetylene, 1-hexyne, 2-butyne, 1-butyne, phenylacetylene and the like. $R_1$ is preferably derived from dicyclopentadiene. However, other Diels-Alder adducts of cyclopentadiene such as methyl dicyclopentadiene, norbornene and norbornadiene may also be used to selectively modify the carboxylic acid terminated unsaturated polyester prepared in step (1).

The dicyclopentadiene useful in this invention is a commercial concentrate product generally prepared by dimerizing a crude $C_5$ stream derived from the cracking of crude mixtures of hydrocarbons as set forth in U.S. Pat. No. 3,557,239. Such commercial concentrate products include Dicyclopentadiene 97 commercially available from Exxon Chemical Company, Houston, Tex., and resin grade $C_{10}$ concentrate commercially available from Dow Chemical Company, Midland, Mich.

The commercial dicyclopentadiene concentrates generally contain from about 60 to about 97 percent by weight of dicyclopentadiene, about 5 to 30 weight percent of the mixed Diels-Alder dimers of diolefins such as butadiene, cyclopentadiene, isoprene, cis and trans piperylene and methyl cyclopentadiene. Any remaining amounts in these concentrates generally contain benzene, cyclopentene, 1,5-hexadiene and oligomers of the above diolefins.

The Diels-Alder adducts of cyclopentadiene with an olefinic or acetylenic hydrocarbon or alkylated derivative thereof, e.g., dicyclopentadiene, can be incorporated into the carboxylic acid terminated unsaturated polyester by two methods, i.e., via an addition reaction

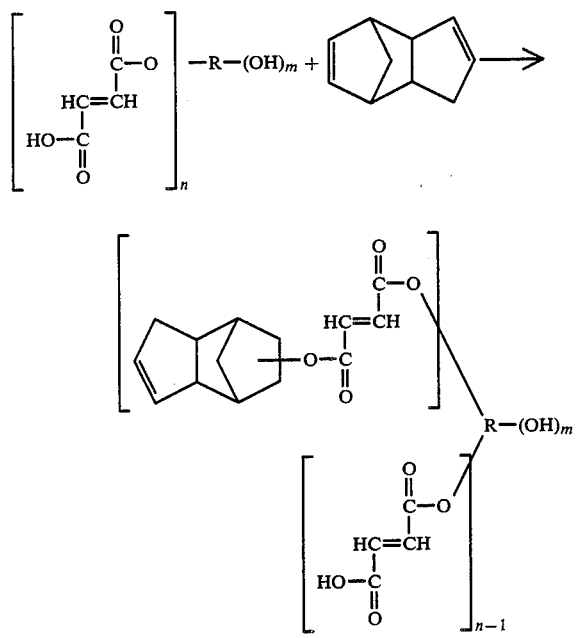

or by a Diels-Alder reaction

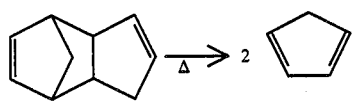

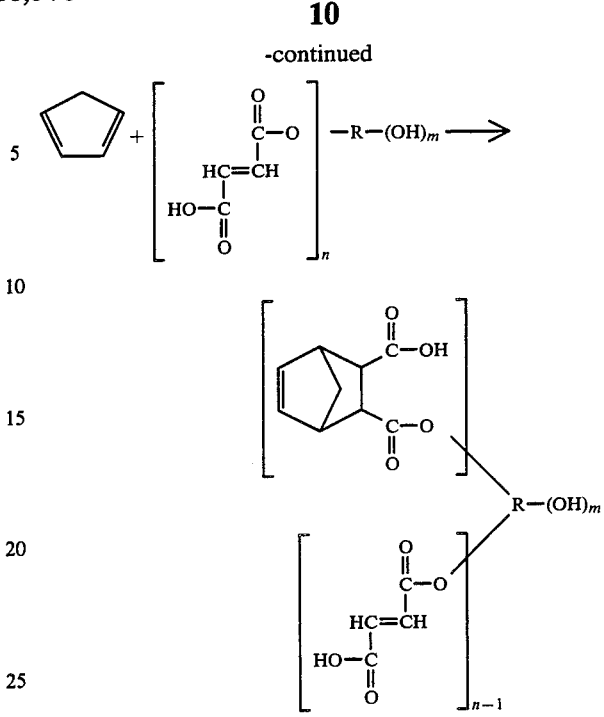

The Diels-Alder reaction may also occur between the internal unsaturation in the polymer chain and cyclopentadiene. The properties of the resin compositions depend critically on how dicyclopentadiene is incorporated. In the process of this invention, conditions are tailored to favor the addition reaction. The formation of Diels-Alder reaction products such as carbic anhydride or carbic acid is selectively minimized by utilizing dicyclopentadiene at the low reaction temperatures employed in the process of this invention. For applications where fast cure is important such as in automotive applications, it is preferable to incorporate dicyclopentadiene via the addition mode. The addition mode is also preferred for improved compatibility of the polyester compositions with ethylenically unsaturated monomers such as styrene and for reduced moisture sensitivity in cured resins prepared therefrom.

The preferred stoichiometry is 0.7 to 1.2 moles of the Diels-Alder adduct of cyclopentadiene with an olefinic or acetylenic hydrocarbon or alkylated derivative thereof, e.g., dicyclopentadiene, per one mole of carboxylic group in the unsaturated polyester prepared in step (1). Since some of the dicyclopentadiene condenses with itself, molar ratios slightly above 1.0 can be employed without difficulty if desired. The unsaturated esters prepared in step (3) have acid numbers of about 70 mg KOH per gram of unsaturated ester or less.

The temperature utilized in the reaction of step (3) can range from about 80° C. to about 140° C., preferably from about 100° C. to about 130° C. Since dicyclopentadiene is thermally unstable above about 150° C., it is necessary to cool the reaction mixture below that temperature prior to the addition thereof. In this manner, the amount of dicyclopentadiene incorporated via the "addition mode" is maximized and very little, if any, Diels-Alder addition takes place. The reaction time for step (3) can vary from about 0.1 hours or less to about 5 hours or longer. The only requirement is that the dicyclopentadiene react with the carboxylic acid terminated unsaturated polyester in the presence of the non-oxidizing acid catalyst having a non-nucleophilic anion for a time and at a temperature sufficient to form the unsaturated ester depicted in empirical formula (II) above. Since the addition of dicyclopentadiene to the fumarate half ester groups of the carboxylic acid terminated unsaturated polyester is an exothermic reaction, it is desirable to add the dicyclopentadiene at such a rate that the reaction temperature remains below about 130° C. An inert solvent may be employed for this step if desired. In the absence of the non-oxidizing acid catalyst having a non-nucleophilic anion in step (2) above, mixtures of carboxylic acid terminated unsaturated polyesters having predominantly terminal fumarate half ester groups and dicyclopentadiene are unreactive at a temperature of 120° C.

Suitable ethylenically unsaturated monomers which can be employed in step (4) above include one or more ethylenically unsaturated copolymerizable monomers which are soluble in and copolymerizable with the unsaturated ester prepared in step (3). Typically, the ethylenically unsaturated monomer is added to the reaction mixture after all of the olefinic compound, e.g., dicyclopentadiene, has reacted in step (3). These ethylenically unsaturated monomers contain at least a single —CH=C> group, and preferably a $CH_2$=C> group and include styrene and its derivatives and homologues, diallyl phthalate, triallyl isocyanurate, nonfunctionalized esters of acrylic or methacrylic acid (such as ethyl acrylate, butyl acrylate, and methyl methacrylate), unsaturated nitriles (such as acrylonitrile and methacrylonitrile) and the like. Also included herein are low levels of maleic anhydride.

Other suitable ethylenically unsaturated monomers include acrylic or methacrylic acid or a functionalized derivative thereof having a molecular weight of less than 300. Mixtures of these may also be used in this invention. The functionalized derivatives are characterized by the presence of acrylate, methacrylate, acrylamide, and methacrylamide groups and also by the presence of functional groups such as hydroxyl, amino, alkylamino, and epoxide, for example. The molecular weight of these monomers is typically less than 300. Preferred monomers are characterized by the following formula:

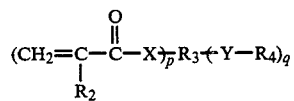

wherein $R_2$ is independently hydrogen or methyl; X and Y are independently —O— or

wherein $R_5$ is hydrogen or lower alkyl; $R_3$ is an aliphatic or aromatic radical containing from 2 to about 10 carbon atoms, optionally containing —O— or

$R_4$ is hydrogen or an aliphatic or aromatic radical containing from 1 to 10 carbon atoms; and p and q are integers of or greater than 1, preferably 1 to 3.

These functionalized derivatives of acrylic or methacrylic acid include 2-hydroxyethyl acrylate, 2-hydroxyethyl methacrylate, hydroxylpropyl acrylate, hydroxypropyl methacrylate, hydroxybutyl acrylate, hydroxybutyl methacrylate, 2-aminoethyl acrylate, 2-aminoethyl methacrylate, 2-methylaminoethyl acrylate, 2-methylaminoethyl methacrylate, 2-dimethylaminoethyl acrylate, 2-dimethylaminoethyl methacrylate, 2-hydroxyethyl acrylamide, 2-hydroxyethyl methacrylamide, 2-aminoethyl acrylamide, 2-aminoethyl methacrylamide, diethylene glycol monoacrylate, diethylene glycol monomethacrylate, 2-methoxyethyl acrylate, 2-methoxyethyl methacrylate, pentaerythritol monoacrylate, pentaerythritol monomethacrylate, pentaerythritol diacrylate, pentaerythritol dimethacrylate, pentaerythritol triacrylate, glycerol monoacrylate, glycerol monomethacrylate, trimethylolpropane monoacrylate, trimethylolpropane monomethacrylate, glycidyl methacrylate, glycidyl acrylate, hydroxymethyl acrylamide and the like or mixtures thereof. It is understood that several isomers of many of these monomers exist and would be suitable for use herein either as individual components or as mixtures with any of the other monomers. Similarly, it is understood that additional derivatives containing aromatic rings and other alkyl groups in the acid or ester portion of the above formula may also be included.

Preferred functionalized derivatives of acrylic or methacrylic acid employed in the practice of this invention include 2-hydroxyethyl methacrylate, 2-hydroxyethyl acrylate, hydroxypropyl acrylate and hydroxypropyl methacrylate.

Mixtures of the aforementioned ethylenically unsaturated monomers may be effectively employed in the practice of this invention.

The preferred ethylenically unsaturated monomers contemplated in the practice of this invention are styrene, vinyl toluene, p-methyl styrene, or a mixture of styrene and 2-hydroxyethyl methacrylate. At least 60 percent of the ethylenically unsaturated monomer should be selected from styrene, p-methyl styrene, vinyl toluene or chlorostyrene.

The ethylenically unsaturated monomer is present in the low shrinking curable resin compositions in an amount of from about 25 to about 60 weight percent, preferably from about 35 to about 55 weight percent. The unsaturated ester prepared in step (3) is present in the curable resin compositions in an amount of from about 25 to about 65 weight percent, preferably from about 35 to about 60 weight percent.

Although the process for preparing the low shrinking curable resin compositions produces no volatiles, a small amount of solid precipitate usually forms. This solid amounts to less than about 3 weight percent of the total resin composition weight, and consists primarily of fumaric acid which is a by-product of step (1). The solid can be removed by centrifugation or filtration.

An essential component of the curable polyester resin compositions of this invention is a thermoplastic polymer low profile additive. In one aspect, the thermoplastic polymer low profile additives that may be employed in this invention are thermoplastic polymers of vinyl acetate, saturated thermoplastic polyesters, and mixtures of the same. In another aspect of the invention, the thermoplastic polymer low profile additives that may be employed herein are thermoplastic polyalkyl acrylate or methacrylate polymers. In still another aspect of this invention, the thermoplastic polymer low profile additives that may be employed in this invention include homopolymers of styrene and substituted styrene and also copolymers containing styrene. The thermoplastic polymer low profile additives suitable for use in the present invention are soluble in or are swelled by the resin mixture of the unsaturated ester material and the ethylenically unsaturated monomer.

Suitable thermoplastic vinyl acetate polymer low profile additives include poly(vinyl acetate) homopolymers and copolymers containing at least 50 weight percent vinyl acetate. Such polymers include, for example, vinyl acetate homopolymer; carboxylated vinyl acetate polymers including copolymers of vinyl acetate and ethylenically unsaturated carboxylic acids, such as acrylic acid. methyacrylic acid, crotonic acid, maleic acid, fumaric acid, itaconic acid and the like or anhydrides such as maleic anhydride; vinyl acetate/vinyl chloride/maleic acid terpolymers, and the like. Reference is made to U.S. Pat. No. 3,718,714 to Comstock, et al. and British Pat. No. 1,361,841 to Comstock, et al. for descriptions of some of the suitable vinyl acetate polymer low profile additives.

The useful vinyl acetate polymer low profile additives ordinarily have molecular weights within the range of from about 10,000 to about 250,000, and preferably from about 25,000 to about 175,000. They are usually employed in the curable polyester resin compositions of this invention in proportions of from about 4 to 25 weight percent, and preferably from about 7 to about 16 weight percent.

Suitable thermoplastic saturated polyester low profile additives are, in general, low molecular weight saturated polymers of polymerizable linear and/or cyclic esters which may contain at least one carboxyl group per molecule.

Polymers of linear and/or cyclic esters, including carboxylated polyers having an average of at least one carboxyl group per molecular which may be used in accordance with the present invention are those which possess number average molecular weights above 2,500, preferably above 4,000. Number average molecular weights may be as high as 500,000.

Suitable polymers are further characterized by the following basic recurring structure Unit I

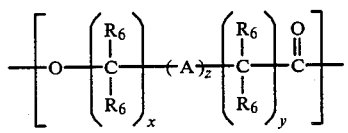

Unit I wherein each $R_6$, which can be the same or different, is hydrogen, halogen, i.e., chlorine, bromine, iodine, or fluorine, or a monovalent hydrocarbon radical generally containing a maximum of 12 carbon atoms, and preferably containing a maximum of eight carbon atoms. A is an oxy group, x is an integer having a value of 1 to 4 inclusive; y is an integer having a value of 1 to 4 inclusive; z is an integer having a value of 0 or 1, with the proviso that (a) the sum of $x+y+z$ is 4 to 6 inclusive and (b) the total number of $R_6$ variables which are substituents other than hydrogen does not exceed 2.

Illustrative of suitable monovalent hydrocarbon radicals for $R_6$ are the following: alkyl radicals such as methyl, ethyl, isopropyl, n-butyl, sec-butyl, t-butyl, n-hexyl, 2-ethylhexyl, n-dodecyl, chloroethyl, chloropropyl and the like; alkoxy radicals such as methoxy, ethoxy, n-propoxy, n-hexoxy, n-dodecoxy and the like; aryl radicals such as phenyl, ethyl phenyl, n-propylphenyl, n-butylphenyl and the like; aryloxy radicals such as phenoxy, n-propylphenoxy, n-butylphenoxy and the like; cycloaliphatic radicals such as cyclopentyl, cyclohexyl and the like.

In one embodiment, desirable polymers of cyclic esters are characterized by both basic recurring structural Unit I supra and basic recurring structural Unit II, as are obtained from a mixture containing a cyclic ester and a cyclic monomer such as ethylene oxide, propylene oxide and the like.

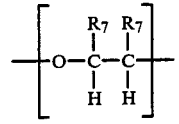

Unit II wherein each $R_7$, is as defined for $R_6$ of Unit I, or in which the two $R_7$ variables together with the ethylene moiety of the oxyethylene chain of Unit II form a saturated cycloaliphatic hydrocarbon ring having from four to eight carbon atoms inclusive. It is preferred that recurring Unit II contains from two to twelve carbon atoms inclusive. The interconnection of Unit I and Unit II does not involve or result in the direct bonding of two oxy groups, i.e., —O—O—.

Particularly preferred polymers of cyclic esters are those which are characterized by the oxypentamethylene-carbonyl chain as seen in basic recurring structural Unit III

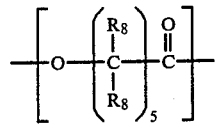

Unit III wherein each $R_8$ is hydrogen or lower alkyl, that is alkyl having a maximum of 4 carbon atoms, with the proviso that no more than three $R_8$ variables are substituents other than hydrogen.

Thermoplastic polymers of cyclic esters are well known and the carboxylated saturated esters are well known and such thermoplastic saturated polymers, and particularly polymers prepared from epsilon-caprolactones, have been advantageously employed as low profile additives. Reference, for example, is made to U.S. Pat. Nos. 3,549,586 and 3,668,178 to Comstock et al. for descriptions of thermoplastic saturated polyester low profile additives and carboxylated thermoplastic saturated polyester low profile additives prepared from cyclic esters. Commercial examples of poly(epsilon-caprolactone) include PCL-150, PCL-300 and PCL-700 from Union Carbide Corporation, Danbury, Conn. A carboxylated poly(epsilon-caprolactone) is commercially available from Union Carbide Corporation as LPS-60.

Also useful are polyesters based on diacids, such as adipic acid, and diols, such as 1,6-hexanediol, 1,4-butanediol and ethylene glycol. These polyesters are described in, for example, U.S. Pat. Nos. 3,909,483; 3,994,853; 2,736,278 and 3,929,868. These polyesters have number average molecular weights of 2,500 to 200,000, preferably between 3,000 and 80,000. A commercial material of this type is Cargill 6701 LPA manufactured by Cargill, Inc., Minneapolis, Minn., which is a solution of a butanediol/ethylene glycol adipate copolyester in styrene.

The thermoplastic saturated polyester low profile additives may usually be employed in the curable polyester resin compositions of this invention in proportions similar to those of thermoplastic vinyl acetate polymers, i.e., in proportions of from about 4 to about 25 weight percent, and preferably from about 7 to about 16 weight percent.

Also suitable are thermoplastic polyalkyl acrylate or methacrylate low profile additives including, for example, homopolymers of methyl methacrylate, ethyl methacrylate, butyl methacrylate, methyl acrylate, ethyl acrylate; copolymers of methyl methacrylate and lower alkyl esters of acrylic and methacrylic acids; and copolymers of methyl methacrylate with minor amounts of one or more of the following: lauryl methacrylate, isobornyl methacrylate, acrylamide, hydroxyethyl methacrylate, styrene, 2-ethylhexyl acrylate, acrylonitrile, methacrylic acid; polystyrene; styrene copolymers, such as, styrene/butadiene copolymers; cellulose acetate butyrate; alkylene oxide polymers; and the like.

The molecular weight of the alkyl acrylate or methacrylate polymers useful in the invention may vary over a wide range, from 10,000 to 1,000,000, and preferably from 25,000 to 500,000. The thermoplastic polyalkyl acrylate or methacrylate polymer should be present in the curable polyester resin compositions of this invention in amounts ranging from about 1 to about 25 weight percent, and preferably from about 4 to about 20 weight percent.

Also suitable are thermoplastic polymer low profile additives including homopolymers of styrene and substituted styrene and also copolymers containing styrene. Such thermoplastic polymers are generally swelled by, but not dissolved by many unsaturated polyester resins. The number average molecular weight of the polystyrene homopolymers or copolymers useful in this invention may vary over a wide range of from about 1000 to about 100,000. The thermoplastic styrene polymer can be present in the curable polyester resin compositions of this invention in amounts ranging from about 3 to about 25 weight percent and preferably from about 4 to about 16 weight percent.

The most preferred thermoplastic polymer low profile additives employed in the practice of this invention are polystyrene and saturated polyesters such as butanediol/ethylene glycol copolyesters of adipic acid, and acid terminated poly epsilon-caprolactone commercially available from Union Carbide Corporation, Danbury, Conn. as LPS-60.

The curable resin compositions may also be treated with a weak base prior to molding. Treatment with a weak base minimizes discoloration caused by high temperatures during cure, especially when hexafluorophosphoric acid or trifluoromethanesulfonic acid (triflic acid) are used as catalysts for the addition of the Diels-Alder adduct of cyclopentadiene with an olefinic or acetylenic hydrocarbon or alkylated derivative thereof, e.g., dicyclopentadiene, to the carboxylic acid terminated unsaturated polyester in step (3). Suitable weak bases include crosslinked polyvinylpyridine, disodium acid phosphate, sodium carbonate, alumina and the like. When using sodium carbonate in the weak base treatment step, a desiccant such as magnesium sulfate is also added to scavenge water generated in the neutralization process. The weak base can be employed in an amount of from about 0.1 weight percent to about 10.0 weight percent, preferably from about 0.2 weight percent to about 5.0 weight percent, based on the total weight of the resin composition. Preferably the weak base is separated from the resin by, for example, filtration before the resin is molded.

It is furthermore desirable to utilize a vinyl polymerization inhibitor in those cases where the curable polyester resin composition is to be stored and/or shipped. Suitable vinyl polymerization inhibitors are hydroquinone, para-benzoquinone, phenothiazine, 4-nitrophenol, t-butyl catechol, quinhydrone, toluhydroquinone, mono-t-butyl hydroquinone, 2,5-di-t-butylhydroquinone, hydroquinone monomethyl ether, the biphenol derivatives described in U.S. Pat. No. 4,158,027, and the like. The amount of inhibitor for the purpose of preventing vinyl polymerization can be that conventionally used, namely, from about 100 to about 1000 ppm of the total weight of the resin composition.

A free radical initiator which initiates curing via the co-reaction of the unsaturated ester and the ethylenically unsaturated monomer can also be included in the curable polyester resin compositions of this invention. These initiators include azo compounds, peroxides, peresters, perketals, and the like including mixtures thereof.

Azo and peroxide initiators are described by, for example, Gallagher et al. "Organic Peroxides Review, Plastics Design and Processing", July 1978, pages 38–42, and August 1978, pages 60–67 inclusive. The technology disclosed in those two articles is incorporated herein by reference. The choice of the specific peroxide or azo initiators or mixtures thereof for the purpose of curing the molding compositions of this invention is within the purview of those having skill in this art and the manner in which such peroxides and azo initiators effect a desirable cure is generally characterized in the aforementioned articles.

Examples of such initiators include 1,1-di-t-butylperoxycyclohexane, 1,1-di-t-butylperoxy-3,3,5-trimethylcyclohexane, 2,2-di-t-butylperoxybutane, 2,2-di-t-butyl-peroxy-4-methyl-pentane, 2,2-dicumylperoxypropane, butyl 2,2-di-t-butylperoxyvalerate, 2,2'-azobisisobutyronitrile, benzoyl peroxide, lauroyl peroxide, di-t-butyl peroxide, t-butyl-perpivalate, 2,5-dimethylhexane-2,5-di-perethylhexanoate, t-butyl peroctoate, t-butyl perneodecanoate, t-butyl perbenzoate, t-butyl percrotonate, t-butyl perisobutyrate, di-t-butyl perphthalate, bis(4-t-buty-cyclohexyl)peroxydicarbonate, methyl ethyl ketone peroxide, 2,4-pentanedione peroxide, ethyl 3,3-di(butylperoxy)butyrate, and the like.

The peresters and perketals may be used in combination with an acid cure accelerator as described in Netherlands published Patent Application No. 7604405. These acids include Bronsted acids with a $pK_a$ value lower than or equal to that of formic acid, such as hydrochloric acid, sulfuric acid, nitric acid, phosphoric acid, trichloroacetic acid, p-toluenesulfonic acid, and the like. Also, Lewis acids or metal halides with Lewis acid properties, such as boron trifluoride and the chlorides of iron, cobalt, zinc and aluminum, may be used.

Additionally, the above described initiators may be used in combination with other cure accelerators such as cobalt compounds. These cobalt compounds include cobalt naphthenate, cobalt-amine cure promoters (such as those designated as PEP 183-S and available from Air Products Incorporated), and the like. These cure accelerators operate by decomposing the curing catalysts at a temperature below their normal activation or decomposition temperature.

Mixtures of free radical initiators may be used advantageously herein, such as mixtures of peresters and/or perketals, of perketals and azo compounds, of peresters and axo compounds, or of an azo compound and a peroxide containing compound.

For coating compositions, a preferred initiator package includes methyl ethyl ketone peroxide and cobalt octoate.

Curing can also be effected by photopolymerization of coatings containing the low shrinking resin compositions of this invention and a photoinitiator. Curing occurs on exposure of such resin compositions to any source of radiation emitting actinic radiation at a wavelength within the ultraviolet and visible spectural regions. Suitable sources of radiation include mercury, xenon, carbon arc and tungsten filament lamps, sunlight, etc. Exposures may be from less than about 1 second to 10 minutes or more depending upon the amounts of particular polymerizable materials and photoinitiators being utilized and depending upon the radiation sorce and distance from the source and the thickness of the coating to be cured. The compositions may also be polymerized by exposure to electron beam irradiation. Generally speaking the dosage necessary is from less than 1 megarad to 100 megarad or more.

The concentration of the initiator or initiator mixture can be varied within wide limits. As a representative range, the concentration can vary from about 0.25 to about 3.0 weight percent, preferably from about 0.5 to about 2.5 weight percent, and most preferably, from about 0.60 to about 2.0 weight percent, based on the weight of the curable polyester resin composition. The best surface characteristics are obtained by heating the resin compositions in a closed mold to initiate cure.

The low shrinking curable polyester resin compositions of this invention may contain fillers such as clay, alumina, silica, mica, calcium carbonate and the like. Calcium carbonate is a preferred filler in resin compositions producing smooth surface composites. In a typical composite, the filler content will be between 5 and 50 weight percent, preferably between 10 and 40 weight percent of the total composition.

An optional component of the low shrinking curable polyester resin compositions of this invention is a viscosity reducing agent. In one aspect the invention employs, generally in combination with thermoplastic vinyl acetate polymer low profile additives and thermoplastic saturated polyester low profile additives, a viscosity reducing agent which is an aliphatic monocarboxylic acid having at least 6 carbon atoms.

The aliphatic monocarboxylic acid employed usually has at least 6 carbon atoms in the chain, and is frequently a saturated or unsaturated fatty acid having from 6 to 24 or more carbon atoms in the chain. Such carboxylic acids may be caproic (hexanoic), caprylic (octanoic), capric ($C_{10}$), lauric ($C_{12}$), myristic ($C_{14}$), palmitic ($C_{16}$), palmitoleic ($C_{16}$), stearic ($C_{18}$), oleic ($C_{18}$), linoleic ($C_{18}$), linolenic ($C_{18}$), and the like acids, and the acids may be either straight chain or branched chain. The viscosity reducing agent can be present in the curable polyester resin compositions of this invention in amounts ranging from about 0.4 to about 6 weight percent, and preferably from about 1 to about 4 weight percent.

The low shrinking curable polyester resin compositions of this invention may also contain one or more of the known types of conventional additives, which are employed for their known purposes in the usual amounts. Illustrative of such additives are mold release agents or lubricants, thickening agents such as magnesium hydroxide, calcium hydroxide and calcium oxide (for SMC and BMC applications), pigments, other thermosetting components such as epoxies, and the like. These additives can be dissolved or dispersed in the curable resin compositions to form a uniform mixture.

The fibers suitable for use in this invention as reinforcing agents have a melting point or a glass transition temperature above about 130° C. These fibers include fiberglass, carbon fibers, aromatic polyamide fibers (such as aramid fibers sold by E. I. duPont de Nemours Company, Wilmington, Del., under the trademark of Kevlar), metal fibers, such as aluminum and steel fibers, boron fibers, and the like. The carbon fibers include those having a high Young's modulus of elasticity and high tensile strength. The carbon fibers may be produced from rayon, polyacrylonitrile or petroleum pitch. Preferred fiber lengths are 1 or more inches. Continuous filaments may also be used. It is also within the scope of this invention to include the use of fiber reinforcements of shorter lengths and also fillers such as milled glass. For smooth surface applications, surfacing veils of glass or carbon or polyaramid fiber may be used.

The preferred fibers are fiberglass, carbon fibers, aromatic polyamide fibers, and mixtures thereof. The molded article contains from about 10 to about 75 weight percent, preferably from about 15 to about 65 weight percent of the reinforcing fiber.

The low shrinking curable polyester resin compositions of this invention are prepared by solution blending the unsaturated ester material, the ethylenically unsaturated monomer, the thermoplastic polymer low profile additive with other optional ingredients such as a free-radical curing agent at ambient temperature. Insoluble additives such as calcium carbonate filler can be effectively dispersed in the curable molding compositions. This mixture constitutes the "resin portion" which is a term used herein.

The smooth surface fiber reinforced molded articles of this invention may be prepared by injecting the resin portion into a bed of one or more of the fibers. After the resin cures, the resulting composite possesses high stiffness and strength. The resulting fiber reinforced molded article also exhibits improved surface appearance resulting from the shrink controlling action of the thermoplastic polymer low profile additive.

A preferred process for the rapid fabrication of a fiber reinforced molded article from the low shrinking curable polyester resin compositions of this invention is described in U.S. patent application Ser. No. 135,906, now abandoned, entitled "Molding Process and Apparatus Therefore," and filed on Apr. 14, 1980 in the name of R. Angell, Jr., which is incorporated herein by reference. In said process, the fiber reinforcement is comprised of one or more fibers with a melting point or a glass transition temperature above about 130° C. The process comprises the steps of (a) providing in a heatable matched metal die mold, a bonded web of one or more of said fibers, (b) providing in an accumulator zone, a liquid body of a thermosettable organic material which is curable upon heating to a thermoset resin composition, the viscosity of said liquid body being maintained essentially constant in the accumulator zone by keeping its temperature below that at which curing of said materials is substantial, (c) closing said mold containing said web, (d) injecting at least a portion of said thermosettable organic material under pressure from said accumulator zone into the mold to thereby fill the cavity in said mold, (e) initiating the curing of said materials by subjecting the materials to a temperature by heating the mold, which is above the temperature at which the curing of said materials is initiated, and (f) opening said mold and removing the cured thermoset article therefrom.

An important aspect of the present invention is that when the low shrinking curable resin compositions are injected into the interior of the mold, the fibers are not displaced or at most, only slightly displaced from their original position. As a result, the positioning of the fiber reinforcement within the framework of the molded article can therefor be predetermined and maintained in the final molded product. This allows one to achieve a molded product having high and predictable mechanical properties. These properties are determined by the original fiber placement in the mold and are not affected by additional fiber movement when the resin system is injected.

In order to prevent or reduce fiber displacement (i.e., movement and/or orientation) during resin injection, the low shrinking curable polyester resin compositions of this invention have a viscosity of from about 10 to about 1500 centipoises, preferably less than about 1000 centipoises, and most preferably less than about 600 centipoises. Curable resin compositions having viscosities higher than about 1500 centipoise generally cause substantial fiber movement in the resulting composites. Such composites having non-uniform fiber distribution exhibit poor mechanical properties.

A preferred apparatus for use in preparing fiber reinforced molded articles from low shrinking curable resin compositions in accordance with this invention is also described in U.S. patent application Ser. No. 135,906, filed Apr. 14, 1980. The apparatus is described as comprising: (a) a heatable matched metal die mold containing one or more cavities therein with means for opening said mold to expose such cavities, and closing the same, and means for controlling the injection of a thermosettable organic liquid to such cavities when the mold is closed, (b) means associated with said mold, whereby one or more fibers in the form of an interlocked mass are provided in a portion of the cavities thereof when the mold is open to expose such cavities and prior to the injection of the thermosettable organic liquid to such cavities when the mold is closed, (c) accumulator means associated with said mold which can contain a thermosettable liquid transportable to means for controlling injection of said liquid to such cavities, and (d) cooling means associated with the means for controlling the injection of such liquid to such cavities, whereby the temperature of the liquid in such injection means is maintained substantially below the temperature of the mold.

Although this invention has been described with respect to a number of details, it is not intended that this invention should be limited thereby. The examples which follow are intended solely to illustrate the embodiments of this invention which to date have been determined and are not intended in any way to limit the scope and intent of this invention.

The resin compositions, non-reinforced castings and cured glass reinforced composites prepared in the examples hereinbelow were evaluated according to the following procedures:

Proton nuclear magnetic spectroscopy was used to determine the relative amounts of maleates, i.e., maleic acid, maleic anhydride, maleate half ester and maleate diester, and the amounts of fumarates, i.e., fumaric acid, fumarate half ester and fumarate diester, in the polyester compositions. In general, a sample was dissolved in $d_6$-dimethyl sulfoxide and the areas for the resonances from the vinylic protons, i.e., —CH=CH—, were compared against each other. The resonance for the vinylic protons in maleic anhydride appeared at approximately $\delta = 7.4$ ppm relative to the protons in tetramethylsilane, the internal standard. Resonances for these protons in fumarates appeared at approximately $\delta = 6.8$ ppm relative to the internal standard, and resonances for these protons in maleates, i.e., maleic acid, maleate half ester and maleate diester, appeared at approximately $\delta = 6.25$ ppm.

Acid Number: A resin sample weighed to the nearest 0.01 gram was added to a flask containing 50 milliliters of a mixture of pyridine and methanol (1:1 volume ratio). The contents in the flask were titrated with 0.5N aqueous potassium hydroxide using phenolphthalein as an end point indicator. The acid number was calculated as follows:

$$\frac{(A)(N)(56.1)}{\text{grams sample}} = \text{Acid No. (mg KOH/gm sample)}$$

where A is the milliliters of potassium hydroxide titration solution required for the resin sample and N is the normality of the potassium hydroxide solution.

Viscosity: A resin sample was equilibrated at 25° C. and the viscosity was determined using a Brookfield model LVT viscometer.

SPI Gel Time: The cure characteristics of the resin compositions were monitored by the procedure described in A. L. Smith, 6th SPI, Chicago, Ill., 1951, Reinforced Plastics Div., Section 1, page 1.

Flexural Strength: ASTM D-790.

Flexural Modulus: ASTM D-790.

Surface Roughness: A Bendix microcorder was used to measure surface roughness on a 0.5 inch section of the fiber reinforced composite (side with surfacing veil). The plaques were held flat during the measurement.

Unless otherwise indicated, the examples hereinbelow utilized high purity dicyclopentadiene commercially available from Exxon Chemical Company, Houston, Tex. as Dicyclopentadiene 97.

Examples 1 and 2 describe the preparation of the resin compositions utilized in making the low profile composites of this invention.

EXAMPLE 1

INto a 5 liter four-necked round bottom reaction flask equipped with a nitrogen inlet and outlet, paddle stirrer, electric heating mantle, thermometer with Therm-O-Watch controller and a 12 inch packed distillation column and distillate receiver was added 1569 grams (16.0 moles) of molten maleic anhydride, 913 grams (12.0 moles) of propylene glycol and 150 milliliters of xylene. The resulting reaction mixture was heated to a temperature of 190° C. with continuous stirring over a 3 hour period. After 40 minutes into the 3 hour period, the reaction mixture had reached a temperature of 165° C. and the first drop of distillate (water)

appeared in the receiver. At the end of the 3 hour period, the reaction mixture had reached a temperature of 190° C. and 72 milliliters of water had been collected in the receiver. The reaction mixture was then maintained at a temperature of from 190° C. to 214° C. for a period of 8 hours. At the end of this 8 hour period, 130 milliliters of water had been collected in the receiver. The reaction mixture was then cooled to a temperature of 150° C., and thereafter subjected to a vacuum of about 27 inches of mercury for a period of 30 minutes to remove any residual water and xylene. A nitrogen blanket was maintained throughout the entire reaction period. Titrimetric analysis indicated that the resulting yellow hazy reaction mixture had an acid number of 207 mg KOH/gram in pyridine/methanol. The high acid number indicated that the reaction mixture consisted predominantly of a carboxyl-terminated unsaturated polyester. NMR spectroscopic analysis revealed that the carbon-carbon double bonds in maleate form (cis) were isomerized to the fumarate form (trans) in the carboxyl-terminated unsaturated polyester during the condensation reaction.

To a 1008 gram portion of the reaction mixture prepared above containing predominantly the carboxyl-terminated unsaturated polyester, which portion had been cooled to a temperature of 120° C., was added 0.3 grams of methylhydroquinone and 2.3 milliliters of fluoroboric acid (a 48 weight percent solution in water). Thereafter, for a period of one hour, 492 grams (3.72 moles) of dicyclopentadiene were added slowly into the reaction flask with continuous rapid stirring at a temperature of from 105° C. to 125° C. The reaction mixture was then maintained at a temperature of 115° C. for a period of one hour with continuous stirring. The extent of the reaction between dicyclopentadiene and the carboxyl-terminated unsaturated polyester was monitored by titration for residual acid, and also by NMR spectroscopy.

Following the one hour heating period, 1000 grams of styrene containing 0.9 grams of methylhydroquinone were added into the reaction flask with continuous rapid stirring. The resulting mixture was cooled to ambient temperature and filtered to give a filtrate product and a small amount of a solid by-product. NMR spectroscopic analysis indicated that the solid by-product consisted predominantly of fumaric acid. The filtrate product was a clear brown fluid. A portion of the filtrate product was diluted with styrene to produce a solution containing 45 weight percent of styrene. The solution had a viscosity of 82 centipoises at 25° C. and an acid number of 10 mg KOH/gram in pyridine/methanol. The low acid number indicated that the filtrate product consisted predominantly of a dicyclopentadiene-terminated unsaturated polyester. NMR spectroscopic analysis indicated that the product prior to styrene addition consisted predominantly of a dicyclopentadieneterminated unsaturated polyester.

EXAMPLE 2

Into a 3 liter four-necked round bottom reaction flask equipped with a nitrogen inlet and outlet, paddle stirrer, electric heating mantle, thermometer with Therm-O-Watch controller and a 12 inch packed distillation column and distillate receiver was added 588 grams (6.0 moles) of molten maleic anhydride, 248 grams (4.0 moles) of ethylene glycol and 50 milliliters of xylene, The resulting reaction mixture was heated to a temperature of 200° C. with continuous stirring over a 4 hour period. Water was collected in the distillate receiver during this period. The reaction mixture was then maintained at a temperature of 200° C. for a period of 3 hours. At the end of this 3 hour period, about 30 milliliters of water had been collected in the receiver. The reaction mixture was then cooled to a temperature of 150° C., and the appearance thereof changed from a clear yellow solution to a cream-colored fluid. A nitrogen blanket was maintained throughout the entire reaction period. Titrimetric analysis indicated that the cream-colored reaction mixture had an acid number of 249 mg KOH/gram in pyridine/methanol. The high acid number indicated that the reaction mixture consisted predominantly of a carboxyl-terminated unsaturated polyester. NMR spectroscopic analysis revealed that the carbon-carbon double bonds in meleate form (cis) where isomerized to the fumarate form (trans) in the carboxyl-terminated unsaturated polyester during the condensation reaction.

After the reaction mixture prepared above containing predominantly the carboxyl-terminated unsaturated polyester was cooled to a temperature of 120° C., 2.3 milliliters of fluoroboric acid (a 48 weight percent solution in water) was added. Thereafter, for a period of 1 hour, 489 grams (3.70 moles) of dicyclopentadiene were added slowly into the reaction flask with continuous rapid stirring at a temperature of from 105° C. to 125° C. The reaction mixture was then maintained at a temperature of 120° C. for a period of 40 minutes with continuous stirring, and thereafter subjected to a vacuum of 27 inches of mercury for a period of 10 minutes. After the vacuum period, the reaction mixture was maintained at a temperature of 120° C. for an additional 10 minute period with continuous stirring. The extent of the reaction between dicyclopentadiene and the carboxyl-terminated unsaturated polyester was monitored by titration for residual acid, and also by NMR spectroscopy.

Following the 10 minute heating period, 846 grams of styrene containing 0.6 grams of methylhydroquinone were added into the reaction flask with continuous rapid stirring. The resulting mixture was a clear brown solution containing a small amount of a solid by-product. This mixture was stirred with 10 grams of $Na_2CO_3$ and 10 grams of $MgSO_4$ for a period of one hour. The resulting reaction mixture was then cooled to ambient temperature and centrifuged to separate the supernatant liquid product from the solids. NMR spectroscopic analysis indicated that the solid by-product consisted predominantly of fumaric acid. The supernatant liquid product was a clear brown fluid with a viscosity of 78 centipoises at 25° C. and having an acid number of 18 mg KOH/gram in pyridine/methanol. The low acid number indicated that the filtrate product consisted predominantly of the dicyclopentadiene-terminated unsaturated polyester. NMR spectroscopic analysis indicated at the product prior to styrene addition consisted predominantly of a dicylopentadiene-terminated unsaturated polyester.

EXAMPLE 3

Into a 5 liter four-necked round bottom reaction flask equipped with a nitrogen inlet and outlet, paddle stirrer, electric heating mantle, thermometer with Therm-O-Watch controller and a 12 inch packed distillation column and distillate receiver was added 1569 grams (16.0 moles) of molten maleic anhydride, 913 grams (12.0 moles) of propylene glycol and 150 milliliters of xylene. The resulting reaction mixture was heated to a temperature of 190° C. with continuous stirring over an 8 hour period. After 40 minutes into the 3 hour period, the reaction mixture had reached a temperature of 165° C. and the first drop of distillate (water) appeared in the receiver. At the end of the 3 hour period, the reaction mixture had reached a temperature of 190° C. and 72 milliliters of water had been collected in the receiver. Xylene was recycled to aid in water removal. The reaction mixture was then maintained at a temperature of from 190° C. to 204° C. for a period of 8 hours. At the end of this 8 hour period, 130 milliliters of water had been collected in the receiver. The reaction mixture was then cooled to a temperature of 160° C., and thereafter subjected to a vacuum of about 27 inches of mercury for a period of 30 minutes to remove any residual water and xylene. A nitrogen blanket was maintained throughout the entire reaction period. Titrimetric analysis indicated that the resulting yellow hazy reaction mixture had an acid number of 164 mg KOH/gram in pyridine/methanol. The high acid number indicated that the reaction mixture consisted predominantly of a carboxyl-terminated unsaturated polyester. NMR spectroscopic analysis revealed that the carbon-carbon double bonds in maleate form (cis) were isomerized to the fumarate form (trans) in the carboxyl-terminated unsaturated polyester during the condensation reaction.

To a 995 gram portion of the reaction mixture prepared above containing predominantly the carboxyl-terminated unsaturated polyester, which portion had been cooled to a temperature of 120° C., was added 0.45 grams of methylhydroquinone and 2.0 milliliters of fluoroboric acid (a 48 weight percent solution in water). Thereafter, for a period of 100 minutes, 384 grams (2.91 moles) of dicyclopentadiene were added slowly into the reaction flask with continuous rapid stirring at a temperature of from 105° C. to 125° C. The reaction mixture was then maintained at a temperature of 115° C. for a period of one hour with continuous stirring. The extent of the reaction between dicyclopentadiene and the carboxyl-terminated unsaturated polyester was monitored by titration for residual acid, and also by NMR spectroscopy.

Following the one hour heating period, 690 grams of styrene containing 0.45 grams of methylhydroquinone were added into the reaction flask with continuous rapid stirring. The resulting mixture was cooled to ambient temperature. During the cooling period, 1379 grams of Cargill 6701 LPA were added into the reaction flask. Cargill 6701 LPA is a solution containing 35 weight percent ethylene glycol/butanediol adipate copolyester in styrene, and commercially available from Cargill, Inc., Minneapolis, Minn. The resulting reaction mixture was filtered to give a filtrate product and a small amount of a solid by-product. NMR spectroscopic analysis indicated that the solid by-product consisted predominantly of fumaric acid. The filtrate product was a solution containing dicyclopentadiene-terminated unsaturated polyester, Cargill 6701 LPA thermoplastic copolyester, and styrene monomer. The filtrate product had a viscosity of 160 centipoises at 25° C.

Into a small glass jar was added 20 grams of the filtrate product prepared above and 1 phr of benzoyl peroxide initiator. The resulting mixture was stirred for 5 minutes and then poured into a 19 mm×150 mm test tube to a depth of 3 inches. A thermocouple was placed into the center of the mixture, and the test tube was then immersed in an oil bath at 82.3° C. The cure speed for the filtrate product is reflected by the gel time and by the total time to peak temperature. Such cure characteristics were determined by the SPI gel time procedure described by A. L. Smith (6th SPI, Chicago, Ill., 1951, Reinforced Plastics Div., Section 1, page 1). The gel time is the time required for the temperature of the mixture to rise from 65.5° C. to 87.8° C. The total time is the time required for the temperature of the mixture to rise from 65.5° C. to the peak temperature. The peak temperature is the maximum temperature achieved during cure. The filtrate product had the following cure characteristics: gel time of 6.4 minutes; total time of 9.6 minutes; and peak temperature of 174° C. The cured plug was opaque and off-white in appearance, and expanded during cure.

Examples 4 through 10 describe the preparation of thermosetting resin mixtures utilized in making the low profile composites of this invention.

EXAMPLE 4

A thermosetting resin mixture was prepared by blending in a Cowles dissolver the following:
 2000 grams of the solution prepared in Example 3 containing a dicyclopentadiene-terminated unsaturated polyester, Cargill 6701 LPA thermoplastic copolyester and styrene monomer;
 2444 grams of Camel Wite (a finely divided calcium carbonate filler having an average particle size of 2.5 microns and commercially available from Genstar Stone Products, Company, Havre de Grace, Md.;
 20 grams of stearic acid; and
 50 grams of zinc stearate.

This mixture was divided into three 1500 gram portions. One portion was blended with 10.13 grams of t-butyl perbenozate initiator.

EXAMPLE 5

A thermosetting resin mixture was prepared by blending in a Cowles dissolver the following:
 1500 grams of the thermosetting resin mixture prepared in Example 4;
 2.70 grams of PEP-183S (a cobalt amine cure accelerator sold by Air Products and Chemicals, Allentown, Pa.); and
 10.13 grams of t-butyl perbenzoate.

EXAMPLE 6

A thermosetting resin mixture was prepared by blending in a Cowles dissolver the following:
 500 grams of the resin prepared in Example 1 containing a dicyclopentadiene-terminated unsaturated polyester;
 91.2 grams of styrene;
 96.2 grams of Styron 687U (crystal polystyrene commercially available from Dow Chemical Company, Midland, Mich.);
 3.5 grams of Zelec UN mold release (an organophosphate mold release agent commercially available from E. I. duPont de Nemours, Wilmington, Del.);
 10.3 grams of t-butyl perbenzoate; and
 687 grams of Camel Wite.

EXAMPLE 7

A thermosetting resin mixture was prepared by blending in a Cowles dissolver the following:
 500 grams of the resin prepared in Example 1 containing a dicyclopentadiene-terminated unsaturated polyester;

91.2 grams of styrene;
96.2 grams of LPS-40A (acrylic acid-modified polyvinylacetate commercially available from Union Carbide Corporation, Danbury, Conn.);
3.5 grams of Zelec UN mold release;
10.3 grams of t-butyl perbenzoate; and
687 grams of Camel Wite.

EXAMPLE 8

A thermosetting resin mixture was prepared by blending in a Cowles dissolver the following:
500 grams of the resin prepared in Example 1 containing a dicyclopentadiene-terminated unsaturated polyester;
91.2 grams of styrene;
96.2 grams of Cargill 6701 LPA;
3.5 grams of Zelec UN mold release;
10.3 grams of t-butyl perbenzoate; and
687 grams of Camel Wite.

EXAMPLE 9

A thermosetting resin mixture was prepared by blending in a Cowles dissolver the following:
500 grams of the resin prepared in Example 2 containing a dicyclopentadiene-terminated unsaturated polyester;
91.2 grams of styrene;
96.2 grams of MB-3700 (polystyrene commercially available from Gulf Oil Chemicals Corporation, Houston, Tex.);
3.5 grams of Zelec UN mold release;
10.3 grams of t-butyl perbenzoate; and
687 grams of Camel Wite.

EXAMPLE 10

A thermosetting resin mixture was prepared by blending in a Cowles dissolver the following:
500 grams of the resin prepared in Example 2 containing a dicyclopentadiene-terminated unsaturated polyester;
91.2 grams of styrene;
96.2 grams of LPS-40A;
3.5 grams of Zelec UN mold release;
10.3 grams of t-butyl perbenzoate; and
687 grams of Camel Wite.

Examples 11 through 17 describe the preparation of low profile fiber reinforced composites of this invention.

EXAMPLES 11 THROUGH 17

Portions of the thermosetting resin mixtures specified for each example in Table A were injected into a 10 inch×5½ inch×1/10 inch constant volume mold preheated to a temperature specified for each example in Table A. Approximately 50 grams (3 plies) of OCF M-8608 swirl glass mat commercially available from Owens-Corning Fiberglas Corporation, Toledo, Ohio, with either 1 ply and/or 2 plies of a veil glass mat positioned on the bottom surface were placed in the 10 inch×5½ inch×1/10 inch constant volume mold prior to injection. The mold was also closed and evacuated for about 5 seconds prior to injection of the particular thermosetting resin mixture. The injection time for each of the examples is specified in Table A. An injection pressure of 250 pounds per square inch was maintained for a dwell period of 5 seconds for each example. The resin mixture penetrated the glass web and wet the fibers before it formed a thermoset composition. Following the cure time specified for each example in Table A, the resulting cured glass reinforced composites were removed from the mold and tested for certain properties identified in Table A. The results of such testing are given in Table A.

TABLE A

| Example | 11 | 12 | 13 | 14 | 15 | 16 | 17 |
|---|---|---|---|---|---|---|---|
| Resin Mixture Composition | | | | | | | |
| Resin Mixture Prepared from Example # | 4 | 5 | 6 | 7 | 8 | 9 | 10 |
| Molding Conditions | | | | | | | |
| Mold Temperature (°C.) | 152 | 152 | 146 | 146 | 146 | 140 | 138 |
| Injection Time (sec.) | 8 | 6 | 18 | 10 | 5 | 17 | 16 |
| Cure Time (sec.) | 90 | 80 | 90 | 100 | 90 | 90 | 100 |
| Total Mold Closed Time[a] (sec.) | 108 | 96 | 118 | 120 | 105 | 117 | 126 |
| Composite Properties | | | | | | | |
| Flexural Strength ($10^3$ psi) | — | — | 31.6 | 31.8 | 29.1 | — | — |
| Flexural Modulus ($10^6$ psi) | — | — | 1.54 | 1.49 | 1.20 | — | — |
| Glass Content (wt. %)[b] | 26 | 27 | 31 | 37 | 29 | 30 | 31 |
| Surface Roughness (microinches) | | | | | | | |
| 1 ply veil | — | — | 123 | 163 | 140 | — | 141 |
| 2 ply veil | 72 | 102 | 100 | — | 133 | 197 | — |

[a]The total mold closed time includes the sum of the evacuation time (5 seconds for each example), the injection time, the dwell time (5 seconds for each example) and the cure time.
[b]Determined by comparing the weight of the composite to the weight of the glass charged to the mold.

As illustrated by Examples 11 through 17, fiber reinforced thermoset resin articles having desirable surface appearance qualities and good mechanical properties can be produced from the curable polyester resin compositions of this invention by a rapid injection molding process. A surface roughness of 100 to 200 microinches is typical of automotive body panels made from sheet molding compound (SMC).

COMPARATIVE EXAMPLE A

Into a 3 liter four-necked round bottom reaction flask equipped with a nitrogen inlet and outlet, paddle stirrer, electric heating mantle, thermometer with Therm-O-Watch controller and a 12 inch packed distillation column and distillate receiver was added 588 grams (6.0 moles) of molten maleic anhydride and 290 grams (4.68 moles) of ethylene glycol. The resulting reaction mixture was heated to a temperature of 90° C. over a one hour period with continuous stirring. When the temperature reached 55° C., 75.6 milliliters (4.2 moles) of water was added to the reaction flask. The reaction mixture was maintained at a temperature of 90° C. for a period of one hour, after which 475 grams (3.6 moles) of resin grade dicyclopentadiene (commercially available from Dow Chemical Company, Midland, Mich. as XAS 1348) was added to the reaction flask over a 12 minute period. The reaction mixture was then heated to a temperature of 121° C. to 125° C. and maintained at this temperature for a period of 3 hours. At the end of this period, the reaction mixture was further heated to a temperature of 200° C. over a period of one hour, and maintained at a temperature of 198° C. to 220° C. for a period of 8.5 hours as water was removed overhead. A nitrogen blanket was maintained throughout the entire reaction period. At the end of this period, the reaction mixture gelled. The product was unsuitable for use as a resin.

I claim:

1. A process for preparing a resin composition comprising the steps of:
   (a) contacting a molar excess of an alpha, beta unsaturated dicarboxylic acid or derivative thereof with an organic polyol for a time and at a temperature sufficient to form a composition comprising a carboxylic acid terminated polyester having the formula:

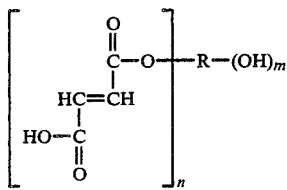

(I)

wherein n is a number having an average value of about 2 to less than about 4, m is a number equal to the free valence of R less the average value of n, the ratio of n to m is greater than about 2.0, and R is the residuum of a polyester which contained from 2 to 4 inclusive hydroxyl groups;
   (b) contacting a Diels-Alder adduct of cyclopentadiene with an olefinic or acetylenic hydrocarbon or alkylated derivative thereof with the carboxylic acid terminated polyester of (a) in the presence of a non-oxidizing acid catalyst having a non-nucleophilic anion selected from the group consisting of fluoroboric acid, hexafluorophosphoric acid, hexafluoroantimonic acid and trifluoromethanesulfonic acid (triflic acid) for a time and at a temperature of from about 80° to about 140° C. sufficient to form a composition comprising an unsaturated ester having the formula:

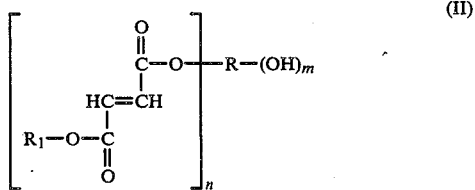

(II)

wherein n, m and R are as defined above, and $R_1$ is the residuum of a Diels-Alder adduct of cyclopentadiene with an olefinic or acetylenic hydrocarbon or alkylated derivative thereof having from 2 to about 20 carbon atoms;
   (c) admixing a copolymerizable ethylenically unsaturated monomer with the unsaturated ester of (b); and
   (d) admixing a thermoplastic polymer low profile additive with the mixture of (c).

2. A process as defined in claim 1 wherein the alpha, beta unsaturated dicarboxylic acid or derivative thereof in step (a) is selected from the group consisting of maleic acid, maleic anhydride and fumaric acid.

3. A process as defined in claim 1 wherein the alpha, beta unsaturated dicarboxylic acid or derivative thereof in step (a) is present in a molar excess amount of between 5 and 60 percent.

4. A process as defined in claim 1 wherein the organic polyol in step (a) is selected from the group consisting of ethylene glycol, diethylene glycol, propylene glycol, and 1,3-butanediol.

5. A process as defined in claim 1 wherein step (a) is carried out at a temperature of from 170° C. to 220° C.

6. A process as defined in claim 1 wherein the carboxylic acid terminated polyester of formula (I) and the unsaturated ester of formula (II) have a ratio of n to m at least about 3.0.

7. A process as defined in claim 1 wherein step (b) is carried out at a temperature of from 80° C. to 140° C.

8. A process as defined in claim 1 wherein the Diels-Alder adduct of cyclopentadiene with an olefinic or acetylenic hydrocarbon or alkylated derivative thereof in step (b) is selected from the group consisting of dicyclopentadiene, norbornene and norbornadiene.

9. A process as defined in claim 1 wherein the Diels-Alder adduct of cyclopentadiene with an olefinic or acetylenic hydrocarbon or alkylated derivative thereof in step (b) is dicyclopentadiene.

10. A process as defined in claim 1 wherein the non-oxidizing acid catalyst having a non-nucleophilic anion in step (b) is present in an amount of from 0.01 weight percent to 4.0 weight percent based on the weight of the unsaturated ester of step (b).

11. A process as defined in claim 1 wherein the copolymerizable ethylenically unsaturated monomer in step (c) is styrene.

12. A process as defined in claim 1 wherein the copolymerizable ethylenically unsaturated monomer in step (c) is a mixture of styrene and 2-hydroxyethyl methacrylate.

13. A process as defined in claim 1 wherein the copolymerizable ethylenically unsaturated monomer in step (c) is present in an amount of from 25 weight percent to 60 weight percent based on the weight of the resin composition.

14. A process as defined in claim 1 wherein the thermoplastic polymer low profile additive is selected from the group consisting of saturated polyesters and polymers of vinyl acetate, alkyl acrylate, alkylmethacrylate, styrene, and substituted styrene.

15. A process as defined in claim 1 wherein the thermoplastic polymer low profile additive is selected from the group consisting of polystyrene, butanediol/ethylene glycol copolyesters of adipic acid, and poly epsilon-caprolactone.

16. A process as defined in claim 1 further comprising treating the resin composition with a weak base.

17. A process as defined in claim 16 wherein the weak base is selected from the group consisting of crosslinked polyvinylpyridine, disodium acid phosphate, sodium carbonate and alumina.

* * * * *